Figures 1, 2:
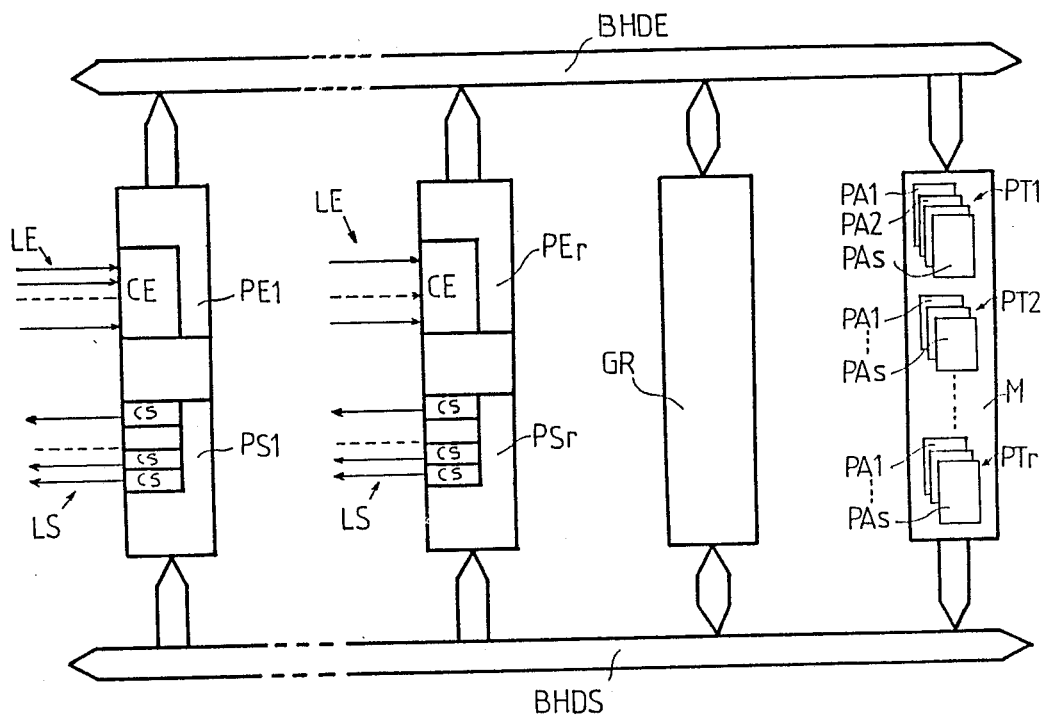

United States Patent [19]

Coatrieux et al.

[11] Patent Number: 4,870,640

[45] Date of Patent: Sep. 26, 1989

[54] DATA PACKET SWITCHING SYSTEM FOR A TRANSMISSION NETWORK

[75] Inventors: Jean-Yvon Coatrieux, L'Hermitage; Daniel Cheminel, Rennes; Bernard Thepaut, Pacé, all of France

[73] Assignees: L'Etat Francais, rerpresente par le Secretaire d'Etat aux Postes et Telecommunications (Centre des Telecommunications), Issy-les-Moulineaux; National d'Etudes and Etablissement Publie de Diffusion dit "Telediffusion de France, S.A.",, Montrouge, both of France

[21] Appl. No.: 67,963

[22] Filed: Jun. 29, 1987

[30] Foreign Application Priority Data

Jun. 30, 1986 [FR] France ................................ 86 09580

[51] Int. Cl.$^4$ ............................................ H04Q 11/04
[52] U.S. Cl. ...................................... 370/60; 370/85.1
[58] Field of Search ....................... 370/58, 85, 60, 62, 370/64, 94, 59

[56] References Cited

U.S. PATENT DOCUMENTS

| | | | |
|---|---|---|---|
| 4,354,263 | 10/1982 | Bordry et al. | 370/94 |
| 4,596,010 | 6/1986 | Beckner et al. | 370/60 |
| 4,603,416 | 7/1986 | Servel et al. | 370/60 |
| 4,674,082 | 6/1987 | Flanagin et al. | 370/60 |
| 4,720,850 | 1/1988 | Oberlander et al. | 370/62 |
| 4,720,854 | 1/1988 | Sand | 370/60 |
| 4,730,305 | 3/1988 | Acampora et al. | 370/60 |

FOREIGN PATENT DOCUMENTS 2549673 1/1985 France .

OTHER PUBLICATIONS

"A High Throughput Packet Switching System", IEEE /47. Conf. on Communications-F. Ishino et al., 1982.

Primary Examiner—M. H. Paschall
Attorney, Agent, or Firm—Daniel Rubin

[57] ABSTRACT

The system comprises input modules (Pei) receiving entering packets, output modules (PSi) transmitting outgoing packets, a control memory (M) with double access and divided into routing modules (PTi, PAj), and a resource control module (GR).

It also comprises an input time-division bus (BHDE) to connect timewise input modules (PEi) to routing modules (PTI, PAj) selected in the central memory (M) and an output time-division bus (BHDS) to connect timewise routing modules (PTi, PAj) of the central memory (M) to output modules (PSi). The control module (GR) is bidirectionally connected to the input modules (PEi) and to the central memory (MO through the input time-division bus (BHDE), on one hand, and to the output modules (PSi) and the central memory (M) by the output time-division bus (BHDS), on the other hand.

11 Claims, 9 Drawing Sheets

DATA PACKET SWITCHING SYSTEM FOR A TRANSMISSION NETWORK

The present invention concerns a data packet switching system and, more specifically, a routing switch centre usable in a data packet transmission network.

In a hierarchical transmission and switching network, the routing switch centres process considerable amounts of traffic. When, in a network, the number of routing switch centres increases, it is the mesh of interconnections which becomes complicated. Large routing switch centers have to be provided in order to reduce the complexity of the mesh of interconnections. This problem is not restricted to data transmission networks, it already existed in telephone switching networks, in which are provided besides the regular routing centres, a few national routing centres. Of course, the problem will exist in integrated services digital networks ISDN currently under development.

The French data packet transmission and switching network TRANSPAC, which presently has 25 switching centres, already requires the use of routing switch centres. The routing centres which have been developed for this purpose have, however, a traffic limit of 7500 packets per second. This limited processing power would lead to an increase in the number of the routing centres with an ensuing complex synchronization.

One aim of the present invention consists in providing a large switching and routing centre which can switch up to 100,000 packets per second.

The performances of known packet switching systems are actually limited by the use of complicated transmission procedures, the use of large buffer memories, and the use of existing computing system architectures. In this respect, in computing systems, the exchanges of data are carried out by conventional low speed buses which limit the traffic to the above-mentioned 7500 packets per second.

In accordance with a feature of the invention, there is provided a data packet switching system consisting of a plurality of input modules receiving the ingoing packets, a plurality of output modules transmitting outgoing packets, a double access central memory divided into routing modules and a resource control module, having also an input time-division bus to connect in time-division mode selected input modules to selected routing modules respectively in the central memory and an output time-division bus to connect in time-division selected routing modules in the central memory to selected output modules respectively, the resource control module being bidirectionally connected to the input modules and to the central memory by the input time-division bus, on one hand, and to the output modules and the central memory by the output time-division bus, on the other hand.

In accordance with another characteristic, each time-division bus, be it input or output, has a plurality of sets of data wires each transmitting parallel bytes of data, and a set of time-division identification wires transmitting the identifications of time intervals forming recurrent frames of time intervals, each frame containing $2^k$ time intervals and, in the sequence of frames, the time intervals time spaced $2^l$ intervals apart, with $K^l$ less than k, form a time transmission channel, the time-division channels being $2^{k-kl}$ in number, one of the said time-division channels being reserved for signalling messages between the modules, either of input, either of output, and the resource control module.

In accordance with another feature, within the time-division channel reserved for signalling messages the time intervals are each allocated to a module.

In accordance with another characteristic, within the time-division channel reserved for signalling, the even (or odd) rank time intervals are allocated to the input or output modules respectively, depending on whether it is an input or an output time-division bus, and the odd (or even) rank intervals to the resource control module.

In accordance with another feature for each packet transmission to the central memory carried on the input time-division bus or from the central memory carried on the output time-division bus, is assigned a time-division channel selected among the time-division channels other than the time-division channel reserved for the signalling.

In accordance with another feature the plurality of sets of data wires consists of a first set of wires used to transmit packet data or input or output module identifications, a second set of wires used to transmit routing module identifications, a third set of wires used to transmit end of packet signals, and a fourth set of wires being used to transmit channel assignments.

In accordance with another feature, in the input time-division bus, the first set of wires is used, firstly, in the even (or odd) rank interval assigned to an input module, to transmit from this input module to the resource control module the routing data of a packet to be switched, then, in response thereto, in one of the odd (or even) rank intervals of the t channel reserved for the signalling messages, the identity of the same input module which receives in the same time interval, through the fourth set of wires, the identification of the assigned channel, the memory also receiving, in the same time interval, the identity of the assigned channel by the fourth set of wires plus the identity of the selected routing module to store the packet through the second set of wires, the exchange of useful data being carried out on the first set of wires in the successive time intervals of the channel assigned between the input module and the routing module selected for it, up to the last byte of the packet which is accompanied by the end of packet signal transmitted on the third set of wires and received simultaneously in the memory and the resource management module.

In accordance with another feature in the output timing bus, the first set of wires is used firstly, in the odd rank (or even) interval of the time-division channel reserved for signalling messages, to transmit the identity of the output module intended to transmit the packet, said output module receiving in the same time interval the identity of the assigned channel, the memory also receiving, also in the same time interval, the identity of the channel assigned through the fourth set of wires plus the identity of the routing module in which is stored the said packet through the second set of wires, the exchange of useful data from the stored packet being carried on the first set of wires in the successive time intervals of the channel allocated between the routing module up to the last byte from the packet which is accompanied by the end-of-packet signal transmitted on the third set of wires and received simultaneously in the output module and the resource management module.

Figure 3:
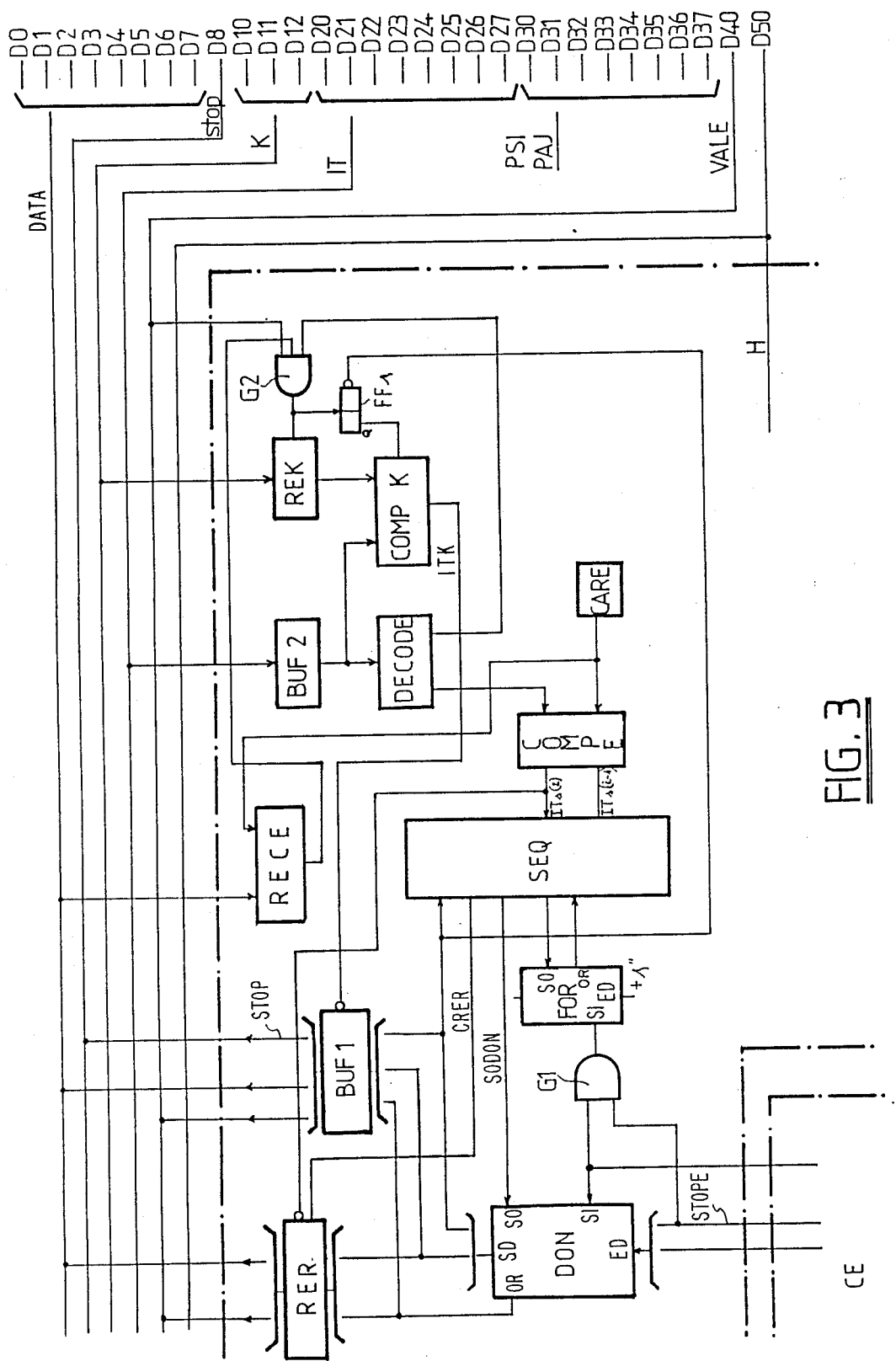
Figure 4:
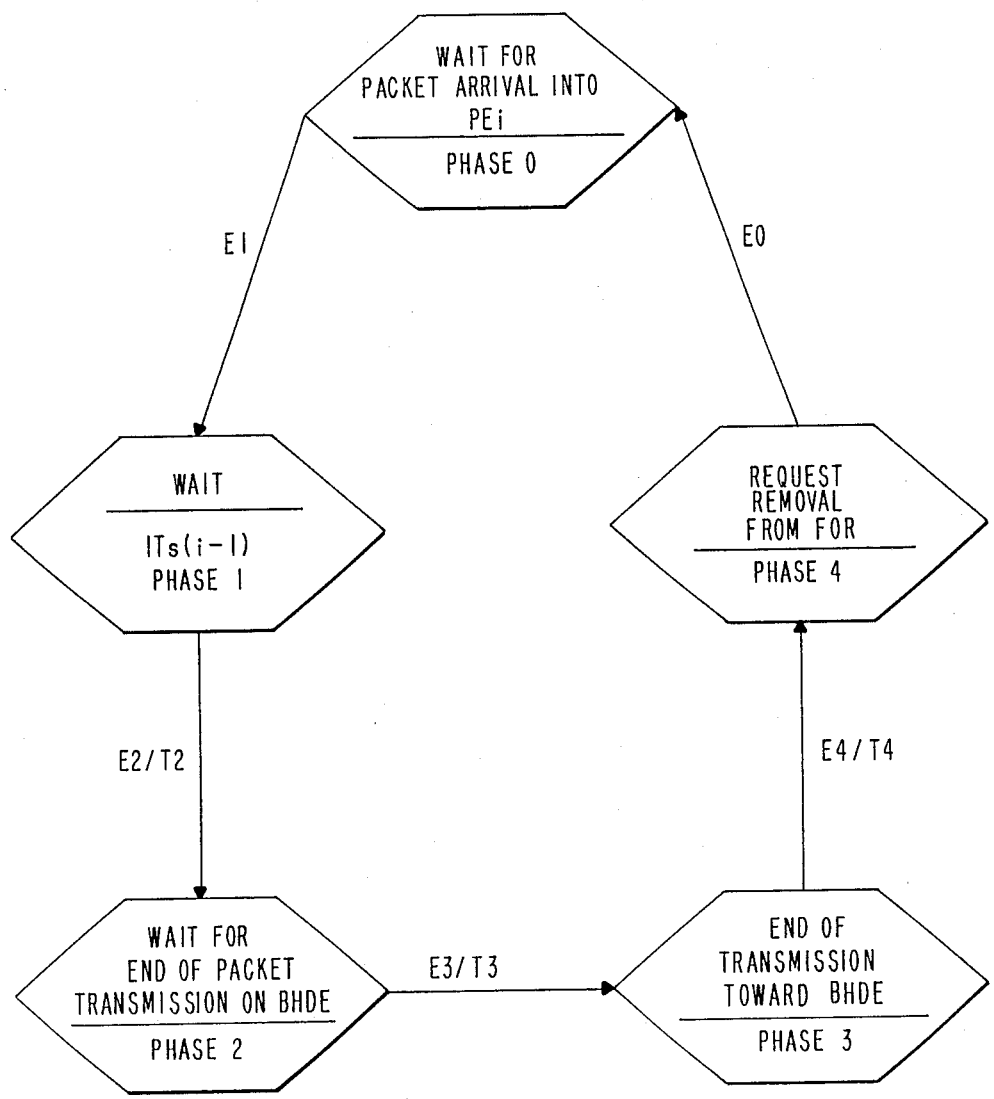
Figure 5:
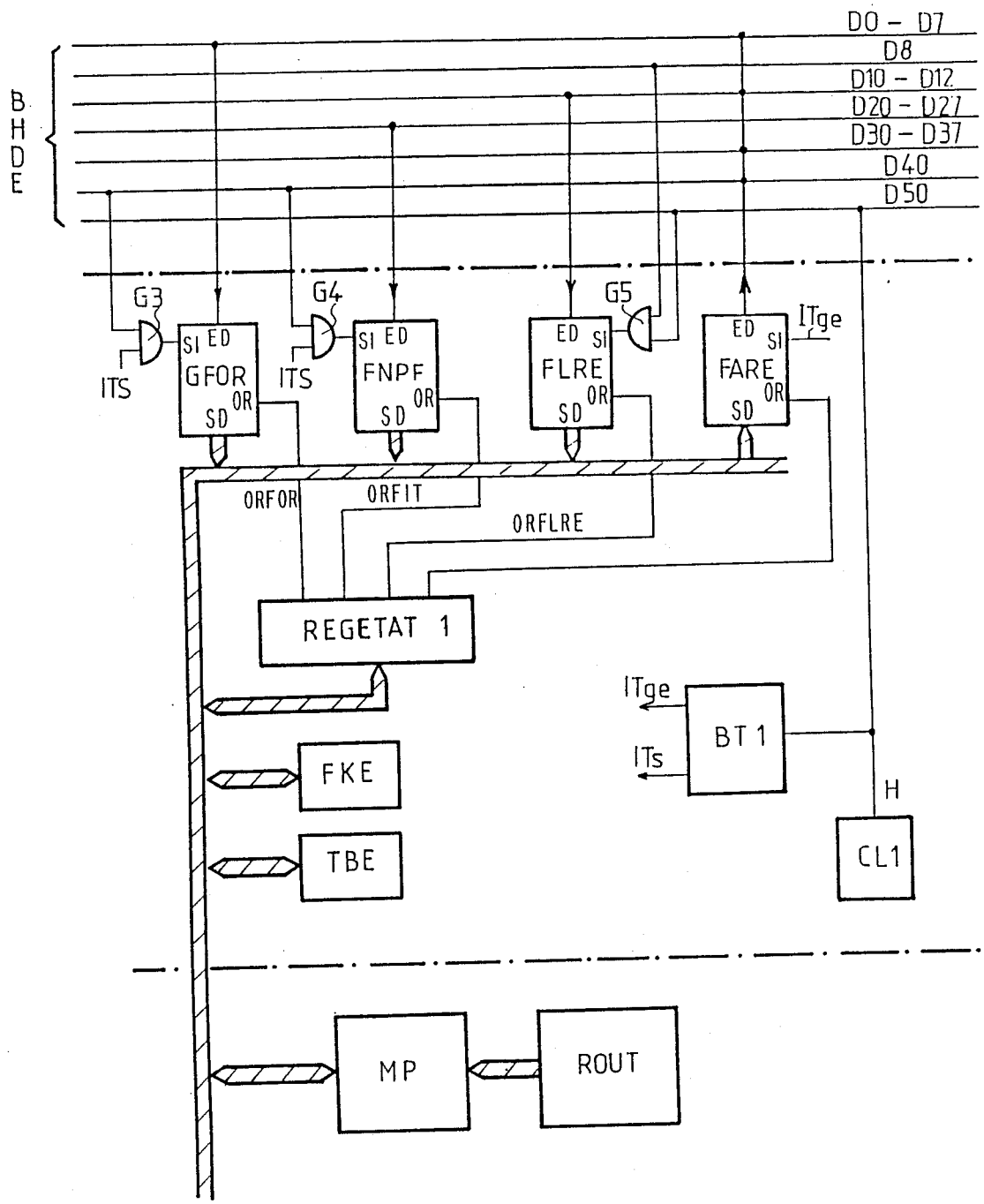
Figure 6:
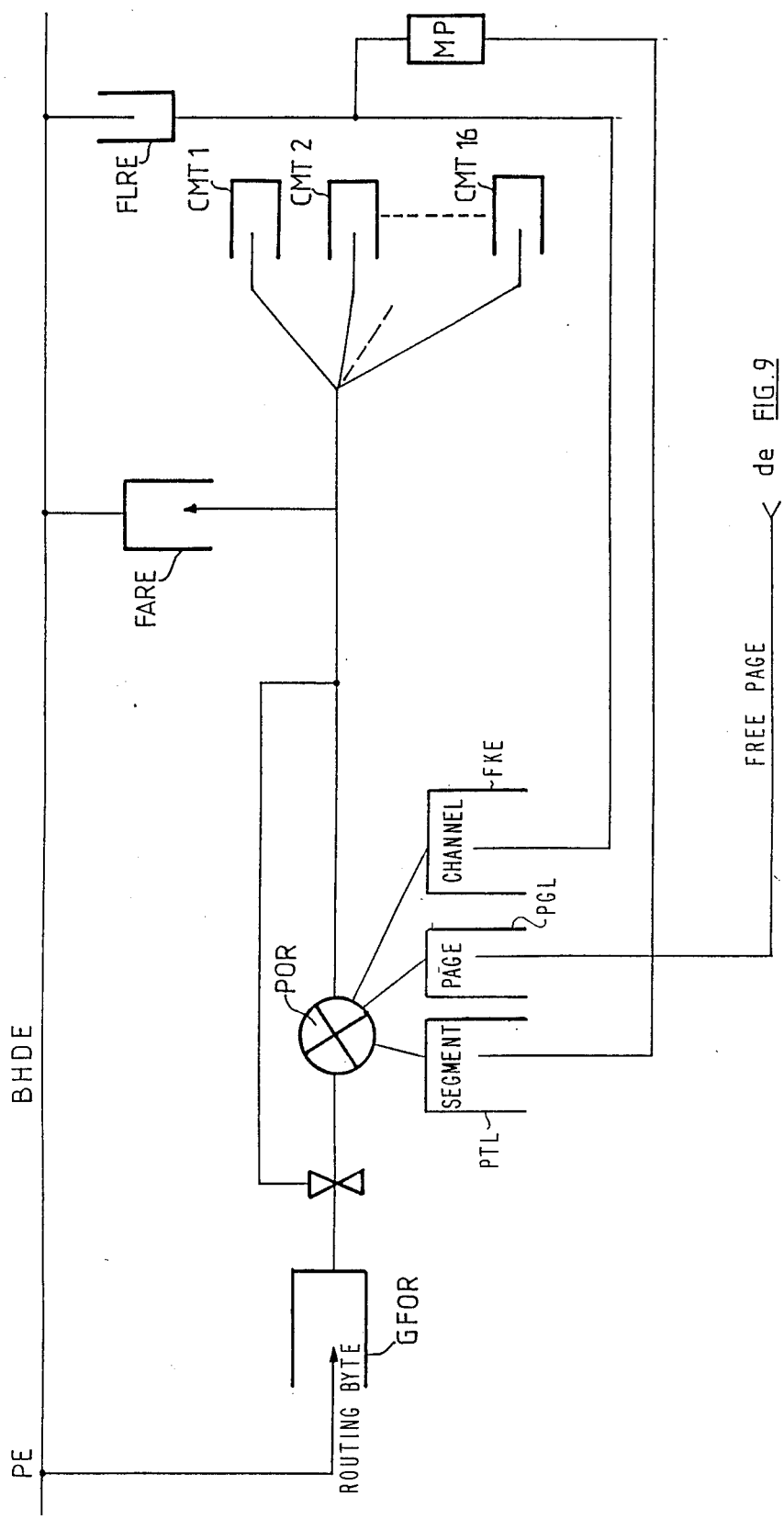
Figure 7:
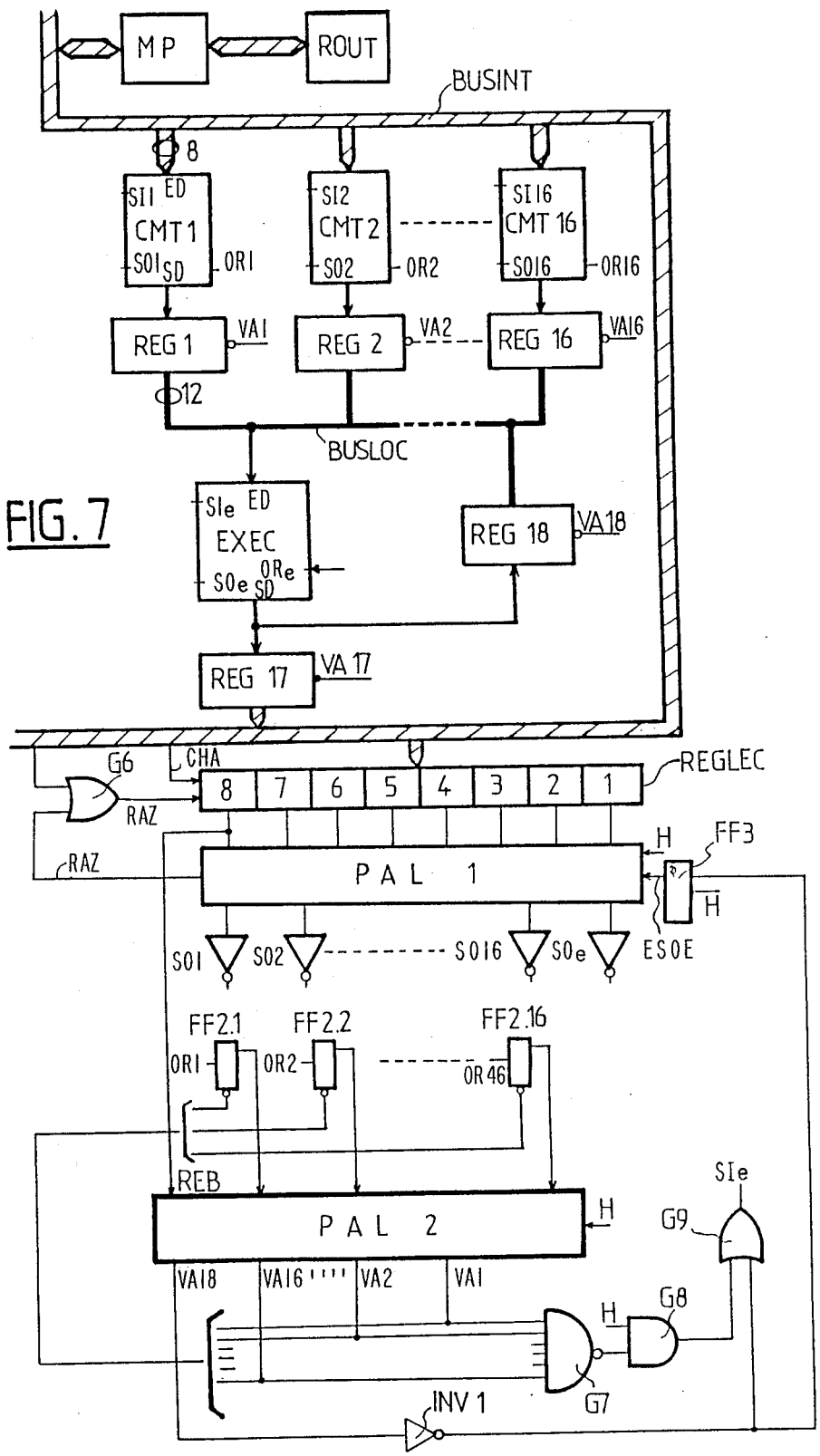
Figure 8:
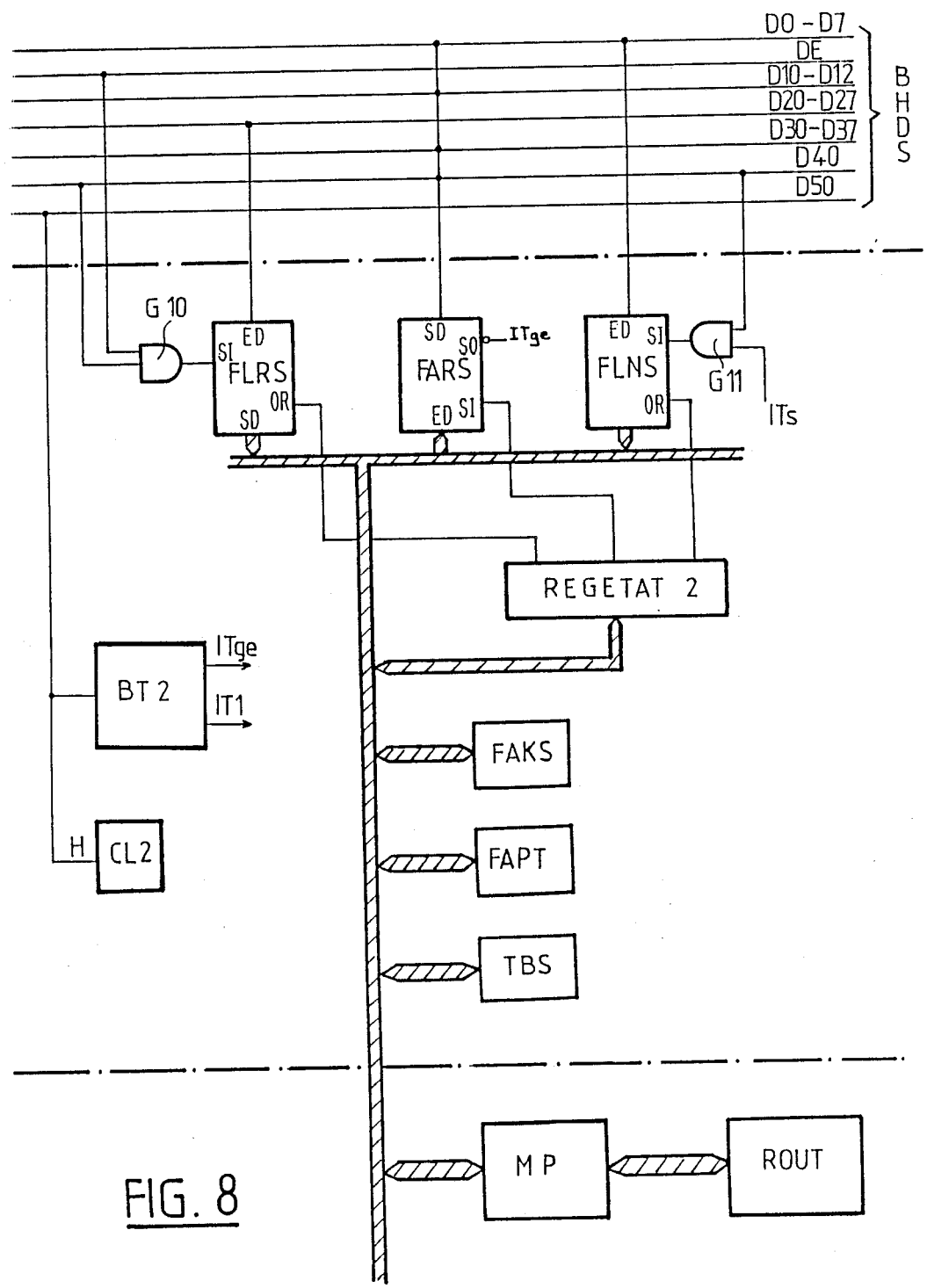
Figure 9:
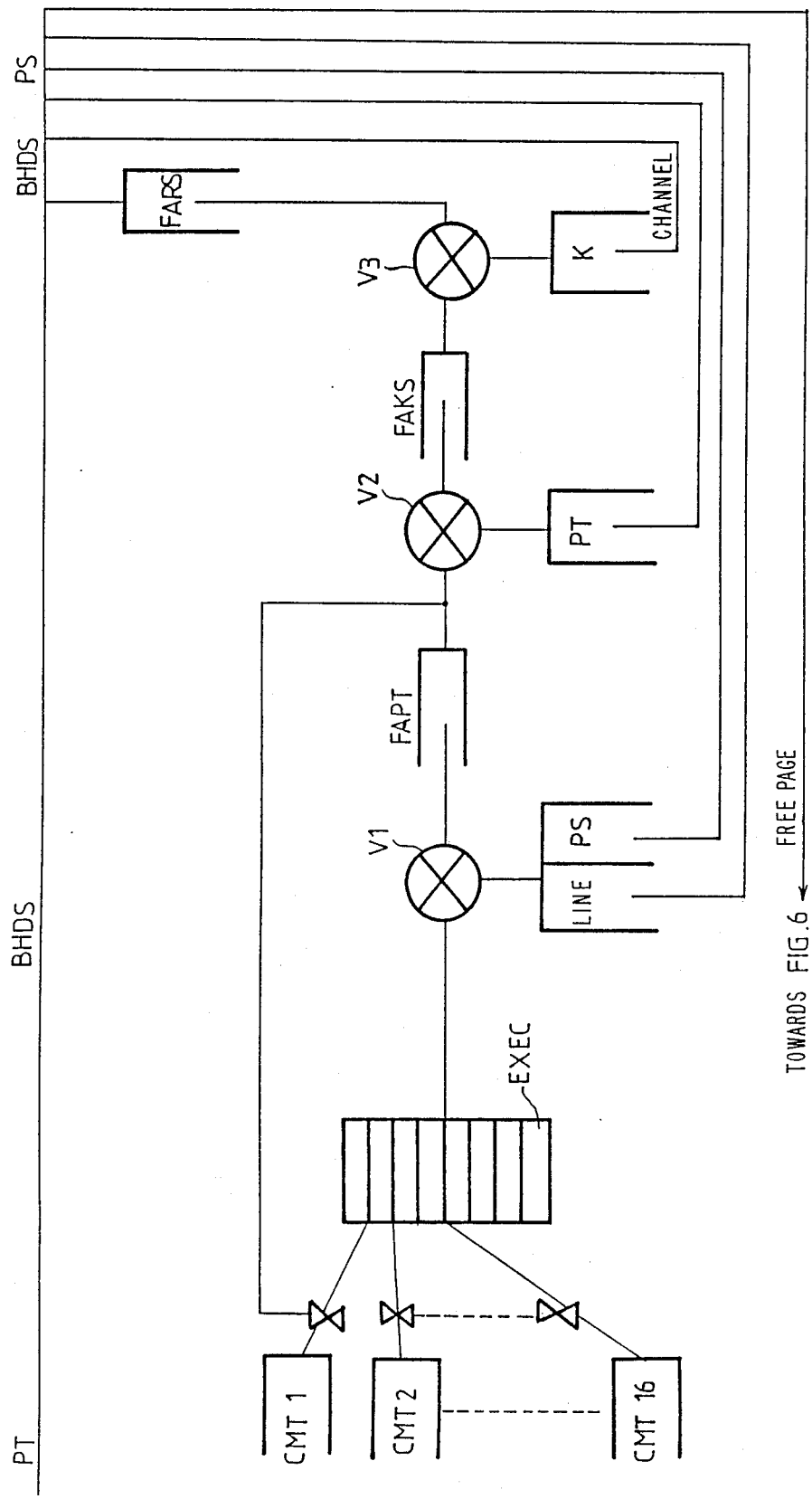
Figure 10:
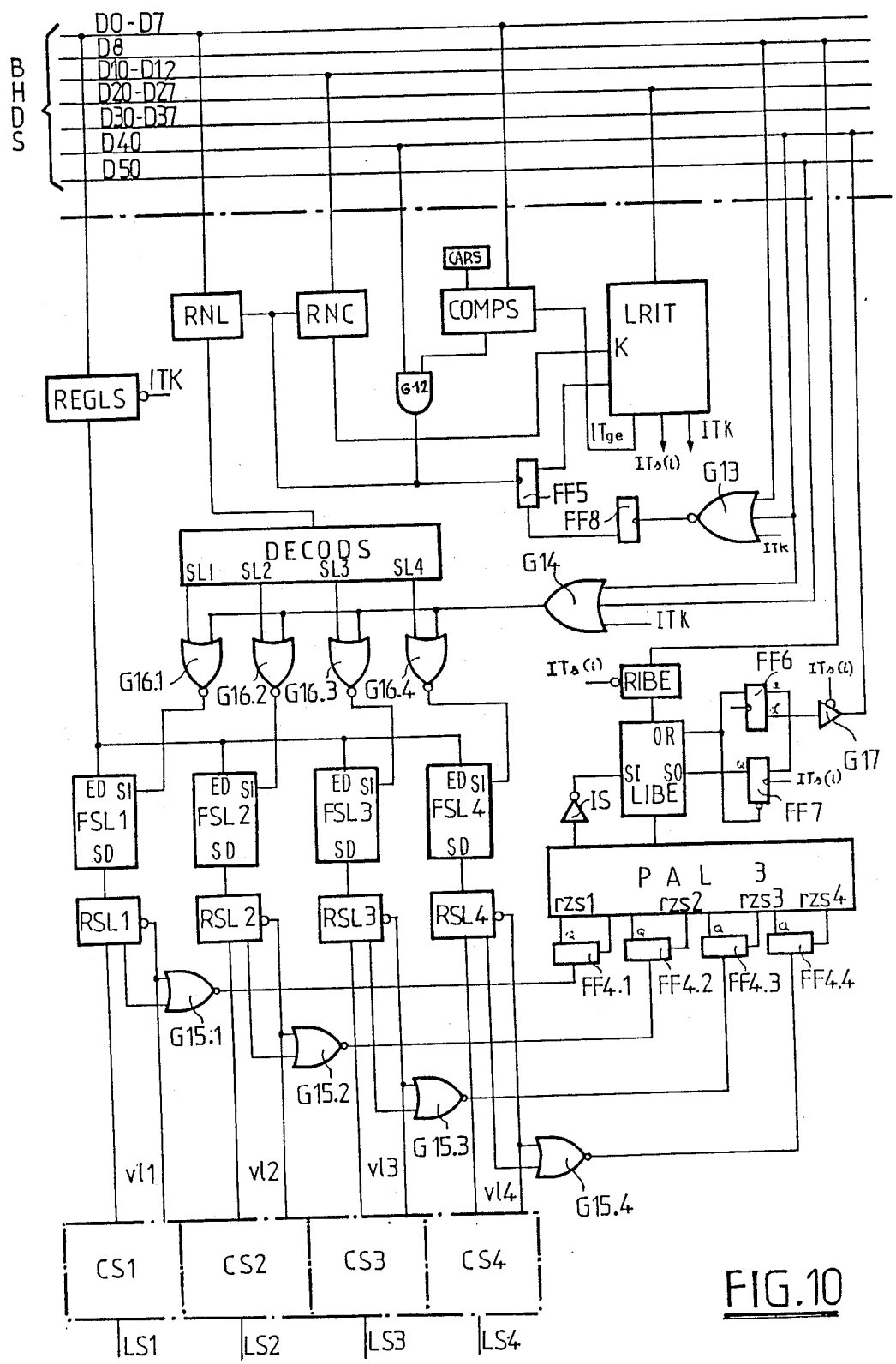

The features of the above-mentioned invention, as well as others, will become clearer upon reading the description of an embodiment, the said description being carried out in relation to the attached drawings, among which:

FIG. 1 is a general block diagram of a routing switching centre in accordance with the invention, FIG. 2 is a timing diagram illustrating the operation of the input or output time-division bus of the switching centre of FIG. 1, FIG. 3 is a schematic block diagram of an input module of the switching centre of FIG. 1, FIG. 4 is a diagram illustrating the operation of the timer of the input module of FIG. 3, FIG. 5 is a schematic block diagram of the input interface of the control module of the switching centre of FIG. 1, FIG. 6 is a schematic diagram illustrating the operation of the control module in the input resource search mode, FIG. 7 is a schematic block diagram of a portion of the control processor inside the control module, FIG. 8 is a schematic block diagram of the output interface of the control module, FIG. 9 is a diagram illustrating the operation of the control module in the output resource scanning mode, and FIG. 10 is a schematic block diagram of an output module in the switching centre of FIG. 1.

The route switching centre of FIG. 1 consists of a plurality of input modules PE1 to PEn, a plurality of output modules PS1 to PSn, a double access central memory M, a resource control circuit GR, an input time-division bus BHDE, an output time-division bus BHDS. The switching centre may also have a data processor bus.

Each of the input modules PE1 to PEn is, on one hand, connected through an input coupler CE, to a number of input lines LE which transmit data packets to it and, on the other hand, to the input time-division bus BHDE to which it transmits on a time-division mode the contents of the packets received from the associated input coupler CE.

Each of the output modules PS1 to PSn is connected, on one hand, through output couplers CS, to a number of output lines LS to which it transmits data packets to be transmitted and, on the other hand, to the output time-division bus BHDS which sends it the data packets in a mode.

The central memory M is a double access memory, one access being connected to the input time-division bus BHDE for writing and the other access being connected to the output time-division bus BHDS for reading. The memory M is, in practice, divided in segments PT1 to PTr, themselves divided into pages PA1 to PAs. One page PAj in a segment PTi makes up a routing module PTi, PAj.

The resource management module GR has a control processor containing a microprocessor, and two interfaces, one for the access to the input time-division bus BHDE and the other for the access to the output time-division bus BHDE. The microprocessor of the control module GR can be selected from the microprocessors specifically designed for switching centres, in particular data switching centres.

The buses BHDE and BHDS are high speed time-division buses on which the data are transmitted on time-division channels which are defined on recurring time frames. Each frame has $2^k$ time intervals. As in the example described, k=8, each frame has 256 time intervals IT0 to IT255. In FIG. 2, there is shown a frame Ti, preceded by the frame T(i−1) and followed by the frame T(i+1). In each column of the frame Ti of FIG. 2, the time intervals follow one another and when the bottom of a column is reached, the subsequent time interval is at the top of the next column. In the other direction, the time intervals are grouped into eight rows C0 to C7. In the switching system of the invention, each row of the unbroken sequence of frames corresponds to a channel Ci.

In the two time-division buses BHDE and BHDS, the first channel or channel C0 is reserved for signalling. Thus, the channel C0 of bus BHDE serves for the signalling exchanged between, on one hand, the control module GR and, on the other hand, the input modules PEi and the input access of memory M. The channel C0 of bus BHDS is used for the signalling exchanged between, on one hand, the control module GR and, on the other hand, the output modules PSi and the output access of memory M.

Each of the other channels C1 to C7 of bus BHDE can be assigned to an input module the time necessary for to transmit a data packet to the input access of memory M. Each of the channels C1 to C7 of bus BHDS can be assigned to an output module PSi the time necessary for an output access from memory M to transmit it a data packet. The assignment of one of the channels C1 to C7 is controlled by signalling from the control module GR.

The buses BHDE and BHDS are identical and, as detailed in FIGS. 3 and 10 each consist of nine wires D0 to D8 used to transmit data bytes in parallel and a STOP signal, three wires D10 to D12 used to transmit the channel number K, eight wires D20 to D27 used to transmit the identity of the time intervals IT0 to IT255, eight wires D30 to D37 used to address a routing module PTi, PAj in the central memory M, a wire D40 used to transmit a clock signal H.

With regards to the operation of bus BHDE, in channel C0, reserved for signalling, the sixteen odd time intervals, that is IT8, IT24, . . . , are reserved for transmission from the control module GR to the input modules PE1 to PEn, with n less than or equal to 16, and the sixteen even time intervals, that is IT0, IT16, . . . , are reserved for transmission from the input modules to the control module GR respectively. In the following we shall designate the time intervals of channel C0 by ITS(i) for the even ranks, where i represents the identification of an input module PEi, the set of time intervals ITs(i) being designated by ITs, and ITge for the odd ranks. In other words, a time interval ITs(i) identifies the input module which transmits a signalling message to the control module. On the entrasy, each time interval ITge designates a message transmitted by the control module, the identity of the input module being contained in the message. With regards to the operation of bus BHDS, we could find, in its channel C0, the assignment of similar even and odd time intervals, the output modules replacing the input modules.

If we consider the words transmitted by the wire D20 to D27, it is apparent that the three most significant bits transmitted by D20 to D22 designate the active channel, when it concerns C0, the bit transmitted by D23 defines the transmission direction and the four least significant bits designate the input (or output) module involved in the signalling.

Without going into details, but to better comprehend the operation of the invention, we will summarize below one phase of the operation of bus BHDE.

When an input module PEi is ready to transmit a packet, it transmits, through by wires D0 to D7, the routing byte of the packet concerned, that is the first byte of that packet, in the even time interval ITs(i) associated to it in channel C0. The control module GR receives this routing byte and proceeds to seek on idle routing module as well as on idle channel from the channels C1 to C7.

Once found the idle routing module PTi, PAj and idle channel Ci, the control module GR transmits, in the first subsequent free time interval ITge, the number K of the idle channel to said module, which recognizes its identity transmitted the bus data wires D0 to D7. At each time interval of this channel Ci, the input module will apply a data byte to the wires D0 to D7. In the time interval where the last byte of a packet is transmitted on channel Ci, the input module concerned also transmits a "1" bit on wire D8, that is the STOP signal, which is received in the control module GR which may thus consider the channel C1 as being idle again and assign it again to one of the input modules, may be the same, for the transmission of another packet.

Further, during the same time interval ITge where the number K of the channel allocated to an input module PEi is transmitted, the control module GR, transmits on wires D30 to D37 of the bus, to the memory M the identity PTi, PAj of the selected routing module. The number K of the channel will then serve to the address memory module M, to direct the data from the packet to the routing module. For example, the bits transmitted on the wires D30 to D32 serve to identity a segment PT1 to PTr, and the bits transmitted on the wires D33 to D37 serve to identify a page PA1 to PAs inside the segment. For example, a page is provided to store a maximum of 256 bytes.

To simplify the following description all the time intervals that are part of the same channel number K, except the signalling channel, will have the reference ITK. The signal VALE transmitted by wire D40 accompanies each information transmission on the bus, in one direction or the other. Finally, the clock signal H whose rate is that of the time intervals is assumed to by applied in each mode to the circuits which need it.

As an indication, the clock signal H has a frequency of 8 MHz, which, with the eight data wires D0 to D7, corresponds to a maximum theoretical rate of 56 M bit/s.

With regards to the bus BHDS, the structure and operation are analogous and are shown in particular during the description of an output module PSi, FIG. 10.

Before describing in details the different modules of the routing centre, we recall that a FIF0 memory, called a file in the following, is provided with a data input ED, a data output SD, a write enable input SI, a read enable input S0, an output IR indicating that the file is not full and an output OR indicating that the file is not empty. We shall consider in the following that the operation of a file is well known.

Also, at the output of certain files are placed buffers which have the role of transmission gates transmitting with a small time delay, at their outputs the informations applied to their inputs. These buffers are used to avoid any interference between circuits downstream of the files and their outputs ED. These buffers transmit when they receive an enable signal. Downstream of the buses, such buffers are also used to do a good separation of each bus from the utilization circuits.

An input module PEi, shown in FIG. 3 is associated to an ingoing line couplers CE whose inputs are connected to a number of ingoing lines LE. The coupler CE is assumed to receive from the lines LE data which are already arranged into packets each containing their routing header. The coupler has a buffer memory, now shown, into which it is supposed to know how to arrange the packets going into a packet file. In the example described, we assume that the packets are made up of bytes of eight bits and that the routing header is made up of a single byte. Of course, in the following one could consider bytes of more than eight bits each. The structure of such a coupler CE is known to someone practicing in the field and in regards to this topic, reference may be made to related literature on the French data transmission system "TRANSPAC".

The coupler CE has a data output connected to the first eight wires of the ED input of a data file DON, an output wire STOPE connected, on one hand, to the ninth wire of the ED input of file DON and, on the other hand, to an input of an AND gate G1 whose output is connected by a wire SIF to the SI input of a request file FOR, and a write enable wire which is connected, on one hand, to a write input of data file DON and, on the other hand, to the second input of gate G1. The files DON and FOR, as well as the gate G1 are in the input module.

Each data packet delivered from the coupler CE has a first routing byte. The end of a packet is indicated by a "1" bit on the STOPE wire.

In the input module, the eight wires of the SD output of data file DON are connected, on one hand, to the input of a request register RER, and, on the other hand, to the input of a buffer BUF1. The ninth wire STOP of the SD output of file DON is connected, on one hand, to a corresponding input of buffer BUF1 and, on the other hand, to a control input of timer SEQ. The file DON has its read input SO connected to time SEQ through a wire SODON and its OR output connected to wire D40 of the bus through register RER and buffer BUF1.

The request file FOR has its OR output connected through a wire ORF to a control input of timer SEQ and its read input SO connected through a wire SOF to an output of timer SEQ. One control input of regiser RER is connected, through a wire CRER, to an output of timer SEQ. The register RER also has a validation input to which is applied the signal ITs(i). The buffer BUF1 has the signal ITK applied to its validation input. The timer SEQ also has two control inputs to which are applied the signals ITs(i) and ITs(i−1) respectively.

The output of register RER is made up of eight wires which are connected to wires D0 to D7 respectively of bus BHDE. Similarly, the output of buffer BUF1 is made up of eight data wires connected to wires D0 to D7, plus a wire STOP connected to wire D8.

The input module PE also has an identification recognizing comparator RECE whose first inputs are connected to wires D0 to D7 of bus BHDE, a channel identity registrations register REK whose data input is made up of three wires connected to wires D10 to D12, a buffer BUF2 whose data input is made up of eight wires which are connected to wires D20 to D27 and a three input AND gate G2 whose first input is connected to wire D40. The output of gate G2 is connected to a validation input of register REK and to the clock input of a flip-flop FF1 whose Q output is connected to the validation input of a comparator COMPK. The output of buffer BUF2 and that of register REK are connected to the two inputs of a comparator COMPK respectively whose output ITK is connected to the validation input of buffer BUF1. In other respects, the output of buffer BUF2 is connected to the input of a decoder DECODE of which one output ITge is connected to the second input of gate G2 and of which another output is connected to an input of a second comparator COMPE. The second input of comparator COMPE is connected to the output of an identity memory CARE which generates a signal representing the identity of the input module PEi. The comparator COMPE has two outputs ITs(i) and ITs(i−1) which are connected to corresponding inputs of timer SEQ. The output ITs(i) is also connected to the validation input of register RER. The second input of comparator RECE is also connected to the output of the identity memory CARE and its output is connected to the third input of gate G2.

The timer is preferably a PROM memory serving to generate the control signals CRER, SODON and SOF. As shown in the diagram of FIG. 4, the state of the timer SEQ goes through five phases at each packet transmission:

Phase 0 which corresponds to the wait for an end of packet transmitted from coupler CE to module PEi,
Phase 1 which corresponds to the wait for the time interval ITs(i−1) which precedes the signalling time interval assigned to module PEi to address a request to the management module,
Phase 2 which corresponds to the wait for the end of the packet transmitted to bus HDBE,
Phase 3 which corresponds to the wait for the end of the transmission of the packet to bus HDBE,
Phase 4 which corresponds to the detection of emptying of file FOR.

The events that cause the timer to pass from a phase HCO the following one are, in order, the following:

E1 which corresponds to testing the OR output of file FOR, the OR output at "1" indicating that a complete packet has arrived into the input module PEi, being understood that the input module cannot send a request to the control module until it has received a complete packet,
E2 which corresponds to the detection of ITs(i−1),
E3 which corresponds to the output of the "1" bit on the ninth wire of the SD output of file DON,
E4 which corresponds to the end of the exchange between the input module and the routing module.

The actions generated during each phase are the following:

T2 which corresponds to the loading of the request register RER under the control of the signal transmitted on wire CRER, that is, to the loading of the routing byte in RER, then the transmission of the signal SODON,
T3 which corresponds to the read command SOF from file FOR,
T4 which corresponds to the end of reading from the file FOR.

In the control module GR, the access interface to bus BHDE, FIG. 5, has three input files BFOR, ENPE and FLRE and an output file FARE. In other respects, it has a status register REGETAT. This interface is connected to a microprocessor MP which is part of the process controller. Thus, the files and status registers are connected to the microprocessor by a conventional interval bus BUSINT.

The OR outputs of the input files GFOR, ENPE, FLRE are connected to wires ORFOR, ORFIT, ORFLRE respectively, which are connected to corresponding inputs of state register REGETAT. It has an output connected by an input wire SIFARE, to the SI input of file FARE, whose S0 input received the signal ITge.

The ED input of file GFOR is connected to wires D0 to D7 of bus BHDE, that of file FNPE to wires D24 to D27, and that of file FLRE to wires D10 to D12. The ED output of file FARE is connected to wires D0 to D7, D10 to D12 and D30 to D37 of bus BHDE.

The SI inputs of files GFOR and FNPE are connected to the outputs of two AND gates G3 and G4 respectively whose first inputs are connected to wire D40 to receive the signal VALE and whose second inputs receive the inputs ITS. The SI input of file FLRE is connected to the output of an AND gate G5 are input of which is connected to wire D8 to receive a STOP signal and the other to wire D40 to receive the signal VAL. The SO inputs of files GFOR, FNPE and FLRE are connected to bus BUSINT.

In practice, file NFPE is used to register the identity of the input module PEi which, in the timer interval ITs(1) which identifies it in the signalling channel C0, transmits a routing byte which is received in file GFOR. The enabled wires ORFO and ORFIT transmit to register REGETAT1 a signal which is stored in it and which indicates that a request is to be processed by microprocessor MP. When the latter looks up REGETAT1 is seeks, on one hand, an idle routing segment PTi and, in a segment, an idle page PAj, and, on the other hand, an idle channel Ci. We shall see in the following how this search is carried out. When the result of the search is positive, the microprocessor MP signals to the status register REGETAT1 that is activates the write enable control wire SIFARE of file FARE and, through bus BUSINT, it transits to file FARE the identity of the channel Ci to be used and the address of the routing module PTi, PAj which will receive the packet transmitted by the input module PEi on channel Ci.

The file FLRE serves to register the identity of a freed channel at the end of a packet, which is signalled by setting wire DI to "1" sending a STOP signal.

The input interface, FIG. 5, also has a clock CL1, which distributes clock signals H on wire D50, and a time base BT, connected to the clock CL1, to supply the signals ITge and ITs corresponding to the time intervals reserved for signalling to the input modules or coming from these through channel C0 respectively.

The input interface, FIG. 5, also has, connected to bus BUSINT, a file FKE in which are stored the number of the idle channels, and a table TBE which stores the states of the routing modules PTi, PAj of the memory module M.

The microprocessor MP, located in the control processor, but connected to bus BUSINT, can read the word stored in register REGETAT1 any time it needs it. As a function of the number of "1" bits in this word, it can achieve, through bus BUSINT, the reading inputs S0 of files GFOR, FNPE and FLRE. IT also has access by reading and writing, to the file FKE, to seek and idle channel, and to table TBE, to seek for instance an idle segment PTi and, in that segment, a free page PAj.

Without going into the details of the memory M, we assume that it has, for example, by seven cards or segments PTi, whose coding requires 3 bits and that each card or segment contains 32 pages PAj, coded with 5 bits. Each page has, for example, a maximum capacity of 256 bytes.

The memory M, of FIG. 1, is assumed to contain its own control circuits which, when they have simultaneously received from the bus BHDE the identity k of a channel and the identity of a routing module PTi, PAj, can write the contents of the arriving packet on this channel into the assigned page of the assigned segment. Each page is associated to an address pointer which is incremented for each byte received in the page and whose incrementing is topped by the stop bit accompanying the last byte of the packet. The value of the pointers which measures the length of the packet, is thus stored in an appropriate area called the length memory.

Each page is also associated to an output pointer whose content will, during the process of reading a stored packet to the bus BHDs, be continuously compared with the value stored in the length memory such that a stop signal is generated with the last byte of the packet.

We will now describe the operation of an input module PEi and of the control module GR with regards to the transmission of a packet entering by the input module PEi towards a routing module PTi, PAj.

By assuming that the file DON is not full, the input coupler CE, FIG. 3, controls the SI input of that file to write into it packet by input ED. The words of the packets are bytes and ninth wire is foreseen to transmit a bit at the end of each packet.

Each end of packet energizes through gate G1 the write input of request file FOR and a "1" bit is written in it. The OR output is energized and this triggers the operating cycle of timer SEQ.

In other respects, on a continuous manner, the buffer BUF2 follows the progress of the time interval word transmitted by the wires D20 to D27. This word is transmitted to decoder DECODE which deducts the identities of successive time intervals of channel C0, C', that is, on one output, the transmitted signal carrying the same reference, and, on the other output, the successive signals corresponding to different input modules, either the signals ITs(1), . . . , ITs(i−1), ITs(i), . . . , ITs(16). These signals are compared with the contents of the memory CARE in comparator COMPE, which for the input module of rank i, generates a first signal at time ITs(i−1), then a second signal at time ITs(i). The first signal applied to timer SEQ, which is assumed to have been activated by the OR output of file FOR, causes the generation of the signal CRER which causes the reading of the routing byte from the file DON to the register RER. The next signal ITs(i) triggers the reading of the contents of the register RER on the wires D0 to D7.

At the instant ITs(1), the wires D20 to D27 of bus BHDE also identify the same instant. Thus, the files GFOR AND FNPE of control module GR, FIG. 5, register the routing byte and ITs(i) respectively. If the file GFOR was previously empty, the OR output puts, into the state register REGETAT1, the bit corresponding to a "1". The microprocessor MP, after looking up the word in the state register REGETAT1, takes into consideration the input exchange request and seeks an idle channel by referring to table TBE. As long as the search is negative, the microprocessor MP does not modify the state of the files GFOR and FNPE. As soon as the search is positive, the microprocessor loads into file FARE, the identity K of the channel read from file FKE and the identity PTi, PAj of the idle routing module read from table TBE. It then translates the contents of the first word of file FNPE to deduce the identity of the calling input module and transmits this identity to file FARE.

If we assume that the file FARE was empty before receiving these informations, at the next instant ITge, the S0 output of file FARE is enabled and are transmitted on wires D0 to D7 of bus BHDE the identity of the input calling module, on wires D10 to D12, the identity k of the channel and, on the wires D30 to D37, the identity of the routing module.

Through buffer BUF2, in the input module PEi, FIG. 3, the decoder recognizes a time interval ITge and enables its corresponding output. In other respects, in comparator RECE, the identity of the module is recognized. Thus, two inputs of gate G2 are enabled, when the signal VAL appears on the third. The output of gate G2 enables register REK which stores the identity k of the channel and sets the flip-flop FF1 such that the comparator COMPK operates.

As a results, each time that the identity of the time interval on the wires D20 to D27 correspond to a time interval of channel k, the comparator COMPK will enable the wire ITk and the buffer BUF1 will apply to wires D0 to D7 a byte read from file DON.

In parallel, in the module memory, the above-mentioned control circuits has been set such that at each time interval of the channel K, the byte present on wires D0 to D7 are stored into page PAj of segment PSI. The address pointer assigned to that page is incremented at each byte which is received.

When the last byte of the packet transmitted by coupler CE appears at the output of file DON, it is accompanied of the stop bit "1". The timer SEQ thus changes state and a "1" bit on wire D8 appears at the output of buffer BUF1. In the control module GR, the gate G3 is thus enabled by its two inputs, and the identity of the time interval is stored in the file FLRE. Finally the flip-flop FF1, is reset to zero, which inhibits comparator COMPK and suppressed the signal ITK on buffer BUF1. Consequently, the reading of file DON is interrupted and the input module PEi stops transmitting.

In the control mode GR, the file FLRE is read by microprocessor MP and identity K of the channel which has just been read is written into file FKE.

The diagram of FIG. 6 summarizes the process followed by the microprocessor MP for the assignment of input resources, that is the assignment of an idle channel and of an idle routing module. It appears that, through bus BHDE, an input module PEi places a routing byte into file GFOR. The microprocessor MP then refers to the idle channel file FKE and table TBE which can consist of two files PT1 and PGL, one for the idle segments, the other for the idle pages. When the three OR outputs of files FKE, PTL, and PGL and enabled the gate POR is opened to allow the flow of words read from those three files to the input of file FARE. Simultaneously, the first routing byte read in file GFOR is transmitted for processing microprocessor MP which selects one file from a number of files CMT1 to CMT16 and writes into it the identity of the routing module generated by the files PTL and PGL.

In the portion of the control processor shown in FIG. 7, we find the microprocessor MP connected to bus BUSINT. A routing table ROOT, connected directly to microprocessor MP, allows when a routing byte read form file GFOR, FIG. 5 is applied to it, the translation of this byte into a link address, that is, an output line LS address connected to an output module PS.

In FIG. 7, the data inputs of as many files as there are output channels are connected to bus BUSINT, that is in the example described with the ED inputs of sixteen files CMT1 to CMT16. Each file CMTi has its Ed input connected to bus BUSINT and its output associated to a buffer REGi whose output is connected by a local bus BUSLOC to the ED input of an EXEC file. The SD output of the EXEC file is associated to two buffers REG17 and REG18, the output of buffer REG18 being also connected to the ED input of the EXEC file by bus BUSLOC while the output of buffer REG17 is connected to bus BUSINT.

In FIG. 7, are also shown for each file CMTi, the write enable inputs SIi and read enable inputs S0i, and the not empty state output ORi, as well as for each associated buffer REGi, the validation input VALi. The EXEC file also has the inputs SIe and S0e as well as the output ORe. Finally, the buffers REG17 and REG18 have their validation inputs VA17 and VA18.

As mentioned above, through bus BUSINT, the microprocessor MP gets from the file GFOR the routing byte and, after referring to the table ROUTE, deduces the identity of the outgoing channel on which the packet will be delivered by the routing. centre. The microprocessor MP thus writes into the file CMTi corresponding to the outgoing channel the address of the routing module PTI, PAj foreseen to store the packet.

Each wire CMti transmits, in addition to its own identity, its coordinates to the EXEC file which assembles the outgoing requests. We note that there are 8 input wires to the CMTI files, corresponding to the address of a routing module, while there are 12 for the EXEC file to add the identity of the CMTi file.

In practice, the reading of the contents of the CMTi file into the EXEC file is controlled by a read control circuit which is also shown in FIG. 7. We must observe that this control circuit operates in such a manner that, in the EXEC file, there is a single word at a time coming from a CMTi file. In other words, there are not simultaneously two words coming from the same CMTI field in the EXEC file.

For each word read into the EXEC file and transmitted to microprocessor MP, through buffer REF17, by bus BUSINT, the microprocessor seeks, following a procedure described in the following, if the corresponding stored packet can be transmitted. If the result of the search is positive, it generates the output cooperates. If the search is negative, the word is rewritten in the EXEC file through buffer REG18.

The read control circuit of the CMTi files and of the EXEC file has a state register which stores an eight bit word, whose data input and whose loading input are connected to the BUSINT bus, and whose individual outputs are connected to the corresponding inputs of an automation PAL1. The four least significant bits in the word stored in register REGLEC, identify the CMTI files, the fifth indicates the command to read the EXEC file to the microprocessor, the sixth indicates the command to simultaneously read, the EXEC file and the CMTI file identified by the four least significant bits, the seventh bit indicates the command to read the singly designated CMTI file, and the eighth indicates the command to activate the buffer 18 to loop the word read into the EXEC file to its input.

The circuit PAL1 also has a clock input H and a control input ESOE, as well as a zero reset output connected to an input of an OR gate G6 whose output is connected to the zero reset input of register REGLEC. The automation PAL1 translates the informations applied to its data inputs to deliver its individual read commands to the outputs SO1 to SO16 and SOe of the EXEC and CMTi files.

The read control circuit also has sixteen flip-flops FF2.1 to FF2.16 whose clocking inputs are connected to the outputs OR1 to OR16 of the CMTi to CMT16 files respectively. The Q outputs of these flip-flops, as in the eight bit output of register REGLEC, are connected to the data inputs of an automation PAL2 whose outputs are connected to the validation inputs VA1 to VA16 and VA18 to buffer REG1 to REG16 and REG18. The automation PAL2 also has a clocking input H. Its purpose is to avoid access conflicts among the files CMTi to the EXEC file.

The outputs VA1 to VA16 of the automation PAL2 are also connected to the zero reset inputs of the flip-flops FF2.1 to FF2.16 and to the inputs of NAND gate G7 whose output is connected to the input of an AND gate G8.

The output VA18 is connected to the input of an inverter INV1 whose output is connected, on one hand, to the D input of a flip-flop whose clocking input receives the clock signal H and whose Q output is connected to the ESOE input of the automation PAL1, and on the other hand, to the input of an OR gate G9. The second input of the OR gate is connected to the output of AND gate G8 and its output is connected to the SIe.

With regards to the operation of the control processor of FIG. 7, the microprocessor MP is programmed to be master of each word to be stored in the register REGLEC.

To read the EXEC fie, it sets the 5th bit of the word to "1", validates the buffer REG17 and receives the identification of the output channel, that is the identification of file CMTI, and the identity of the routing module concerned. It searches if the following conditions occur simultaneously: a channel on the output timing bus is idle, the slot of the routing segment concerned is idle and the output channel, that is, the outgoing requested line and its output segment is idle. If the answer is positive, it sets the 6th bit of register REGLEC to "1" to extract the corresponding 12 bit word from the EXEC file and writes into the same CMTi file the first four identification fits, which triggers the reading of the first word from it into the EXEC file. A new word concerning the same channel is thus read into the EXEC file and we are assumed that a single word from the CMTi file exists in the EXEC file.

If the answer is negative, the microprocessor MP sets the eight bit to "1" which in effect validates VA18 through circuit PAL2 and enables the reading of the first word of the EXEC file to rewrite it at its input, that is to do a loopback. In this manner, we are assured that the order of the packets transmitted to the output modules is maintained.

The diagram of FIG. 9 illustrates the search procedure for the output procedure as carried out by the microprocessor MP. In this diagram, we have a schematic representation of the files CMT1 to CMT16 which correspond to the different output links, which are selectively connectable to the EXEC file which enables the microprocessor MP to scrutinize the requests. The output of the EXEC file leads to a first symbolic lock V1 which opens when the requested output line LS and the output module PS which serves that line are both idle. For this, the identities of the idle outgoing lines and outgoing modules are written in a table TBS, FIG. 8, when the microprocessor MP can refer to. The clock output of lock V1 is connected to a file FAPT, FIG. 8, in which are written the identities of the requested line-module pairs.

The output of file FAPT is connected to a second symbolic lock V2 which is open when the microprocessor MP, having locked up a memory TBS, has found that the segment PTi, which contains the page in which is stored the packet, is idle. In this case, the identity of the routing module PTi, PAj, plus that of the outgoing pair form file FAPT, are transmitted by lock V2. However, if the segment of the routing module concerned is not idle, the first request to be used in the EXEC file is reintroduced to its input, the next request being then processed by the microprocessor.

When the lock V2 opens, a file FAKS, which is used to store the numbers of the idle outgoing channels and whose output goes to the third lock V3 is consulted by the microprocessor MP. If it finds an idle channel, it opens the third lock V3 which allows the writing into the file FARS the identities of the line-output pair, the channel and the routing module concerned.

To be noted that an "idle Page" wire which starts from the output timing bus BHDS and goes to FIG. 6 is shown. The purpose of this wire is to show that the identity of each page freed after transmission of the packet it contained is transmitted to table TBE which the microprocessor looks up before allowing a transfer coming from an input module. In the control circuit GR, the access interface to the output timing bus BHDS, FIG. 8, has two input files FLRS and FLLS, and an output FARS file. The SD outputs of the FLRS files and the ED input of file FARS are connected to microprocessor MP through the internal bus BUSINT. This interface also has a clock CL2 and a time base BT2 similar to the clock CL1 and the time base BT1.

The OR outputs of the input files FLRS and FLLS are connected, by the output wires ORFLRS and ORFLLS of register REGETAT2 respectively. The SI input of the output file FRS is connected, by the wire SIFARS, to a corresponding output of register REGETAT2.

The ED input of file FLRS is connected to wires D20 to D27 of bus BHDS and its input SI is connected to the output of a two input gate G10 whose two inputs are connected to wires D8 and D40 of bus BHDS respectively. The ED input of file FLLS is connected to wires D0 to D7 of bus BHDS and its input SI is connected to the output of a two input AND gate G11 one input of which is connected to wire D40 and the other to the output ITs of a time base BTe. The SD output of file FARS is connected to wires D0 to D7, D10 to D12 and D30 to D37 of bus BHDS. The so input file FARS is connected to the output ITge of time base BT2.

When the microprocessor MP has found resources to transmit an outgoing packet, it writes into file FARS the identities of the channel assigned to the transfer, of the output module of the outgoing line and the routing point in which the packet is thus stored. At each time interval ITge of the signalling channel CO, the file FARS transmits such an identity set on bus BHDS, accompanied by a signal VAL on wire D40.

We have also shown on FIG. 8, the files FAKS, FAPT and table TBS connected to bus BUSINT.

An output module PSI shown in FIG. 10, is associated, in the example shown, to four outgoing line couplers CS1 to CS4 which are connected to four outgoing line LS1 to LS4 respectively. Each coupler CS1 to CS4 is supposed to receive from the output module PSi data arranged in packets and be able to transmit these packets on the associated outgoing line.

The output couplers PSi has a buffer REGLS whose data inputs are connected to wires D0 to D7 and D8 of the output bus BHDS, a register RNL whose data inputs are connected to wires D4 to D7, a register RNC whose data inputs are connected to wires D10 to D12, a comparator COMPS whose first data inputs are connected to wires D0 to D3 and second data inputs to the output of an identity card CARS if the output module, a logic circuit LRIT whose data inputs are connected to wires D20 to D27, and AND gate G12 one input of which is connected to the output of comparator COMPS and the other to wire D40, a three input NAND gate G13 whose first input is connected to wire D8, the second to wire $40 and the third to the ITK output of circuit LRIT, and a three input NAND gate G14 whose first input is connected to wire D40, the second to wire D50, and the third to the ITK output of circuit LRIT.

The buffer REGLS has a read enable input connected to the ITK output of circuit LRIT and its data output is connected in parallel to the ED inputs of four files FSL1 to FSL4 whose outputs SD are connected to the data inputs of four output buffer RSL1 to RSL4 respectively. The read control inputs of buffers RSL1 to RSL4 are connected to control wires V11 to V14 coming from the couplers CS1 to CS4 respectively, and their data outputs are connected to the data inputs of these output couplers respectively. The buffer REGLS, the files FSL1 to FSL4 and the buffers RSL1 to RSL4 process nine bit words. The output wires corresponding to the ninth bits in the buffers RSL1 to RSL4 are connected to the first inputs of four NAND gates G15.1 to G15.4 whose second inputs are connected to the read enable wires of these buffers respectively and whose outputs are connected to the clocking inputs of four flip-flops FF4.1 to FF4.4 respectively.

The data output of register RNL is connected to the input of a decoder DECODS with four outputs SL1 to SL4 corresponding to the four output couplers CS1 to CS4 respectively. The outputs SL1 to SL4 are connected to the first inputs of four NAND gates G16.1 to G16.4 respectively whose second inputs are connected to the output of gate G14 and whose outputs are connected to the inputs SI of the four files FSL1 to FSL4 respectively.

The register RNC has its output connected to a K input of logic circuit LRIT. The output of gate G12 is connected, on one hand to the write enable inputs of registers RNL and RNC and, on the other hand, to the clock input of a flip-flop FF5 whose Q output is connected to an enable input of logic circuit LRIT.

The logical output LRIT with three outputs ITge, ITs(i) and ITK generating the corresponding signals: that is the signals identifying the time intervals ITGE and ITs(i) allocated to the output module in channel C0 and the time intervals ITK being part of channel K allocated by the control module for the reception of a packet in the output module. The output ITge is connected to an enable input of comparator COMPS.

The Q outputs of flip-flops FFr.1 to FF4.4 are connected to four inputs of an automation circuit PAL3 respectively, whose corresponding outputs rzsl to rzs4 are connected to the zero reset inputs of flip-flops FF4.1 to FF4.4. In other respects, the circuit PAL3 has a clock input H, a data output connected to the input of a four-bit word file LIBE and a control output connected, through an inverter IS, to the SI input of file LIBE. The SD output of file LIBE is connected to the input of a buffer RIBE whose enable input is connected to the ITs(i) output of circuit LRIT and whose output is connected to wires D4 to D7 of bus BHDS. The OR output of file LIBE is connected, on one hand, to the D input of a flip-flop FF6 and, on the other hand, to the zero reset input of a flip-flop FF7. The Q output of flip-flop FF5 is connected to the SO input of file LIBE. The clock inputs of flip-flops FF6 and FF7 are connected to the ITs(i) output of circuit LRIT. The Q* output of flip-flop FF6 is connected to the input of a transmission gate G17 whose control input is also connected to the ITs(i) output and whose output is connected to wire D40 of bus BHDS.

The output of gate G13 is connected to the clock input of a flip-flop FF8 whose Q* output is connected to the zero reset input of a flip-flop FF5.

We will now describe the operation of an output module PSi and the control module GR with regards to the transmission of an outgoing packet from a routing module PTi, PSj to the output module PSi.

The transfer of a packet implies that the output module Si is idle, that the output line LSi is idle, that the segment PTi is idle in reading and that there is an idle channel Ci. In a time interval ITge of channel C0 from the output bus BHDS, the control module GR transmits through file FARS, on wires D0 to D3, the identity of the output module PSi, on the wire D4 to D7, the identity of the outgoing line LS1 to LS4, on the wires D10 to D12, the identity K of channel Ci, on wires D30 to D37, the identity of the transit module and, on wire D40, the signal VAL. Of course, the clock is always provided on wire 50 and the time interval ITge is seen on wires D20 to D27.

In the output module PSi, the time interval ITge is seen in the logic circuit LRIT which enables comparators COMPS. In comparator COMPS, the identity of the module is compared with that which is stored in memory CARS. In the output module thus selected, the gate G12 is enabled through its input receiving the signal VAL and the output of comparator COMPS. The output of gate G12 validates the buffers RNL and RNC, and sends a clock signal to flip-flop FF5 whose Q output delivers to circuit LRIT a lock command which forces this circuit to keep in memory the identity K of the channel Ci selected for the exchange.

The identity of the outgoing line LS1 to LS4 to which is intended the packet is decoded in decoder DECODS, and the corresponding output of decoder DECOS is enabled and keeps this state, say, for example the output SL1. As a result at each subsequent ITK, the gate GF16.1 will be open, thus directing the bytes of the data packets going through the buffer REGLS to file FLS1. The corresponding output coupler CSL1 reads the output buffer RSL1 of file FSL1 at its proper rate through wire V11. Thus, the contents of the packet goes into the memory, not shown, of the output coupler CS1.

When the STOP signal, accompanying the last byte of the packet is received in gate G13 which has its two inputs enabled by the VAL signal, on one hand, and the ITK identifying the channel, on the other hand, the flip-flop FF8 changes state and resets to zero flip-flop FF5, which stops the transmission of the ITK by logic circuit LRIT. The entering of data in file FSL1 is thus topped by gate G14 which remains disabled until the next packet to be transmitted by the output module PSi considered.

When mentioned above, the couplers CS1 to CS4 read at their proper rates the files FSL1 to FSL4 respectively. Since the packets to be transmitted are of different lengths, it can happen that one file receives a packet before another file but that the latter be empty before the first.

That is why, when the last word of a packet accompanied by the STOP signal, is read in one of the buffers RSL1 to RSL4, the corresponding gate G15.1 to G15.4 is enabled and sends a clock signal to the corresponding flip-flop FF4.1 to FF4.4. The automation PAL3 decodes the identity of the outgoing line which has received the last byte of a packet and transmits its identity to file LIBE. In practice, the function of the automation PAL3 is to process the conflicts which can arise on its four inputs, because a number of files FSL1 can be empty at the same time, and to write the identities of the lines freed in file LIBE.

The identity of a freed line is transmitted through the buffer RIBE to wires D4 to D7 of bus BHDS in the subsequent time interval ITS(i) which corresponds to the output module PSi in the signalling channel C0. In other respects, the OR output of file LIBE has applied a signal to flip-flop FF6 which is stored at the time ITs(i) such that, through gate G10 enabled at the same time, a VAL signal is applied to wire D40 of bus BHDS. The flip-flop FF7 recopies flip-flop FF6 at the end of the time intervals IT(s) and it reactivates the SO input of file LIBE. The OR output of file LIBE then resets flip-flop FF7 to zero.

In the time interval ITs(i), the control module GR thus receives, through file FLLS the identity of the outgoing line which it can consider as idle. We must also note that at the time where the routing module PTi, PTj has sent the last byte of the packet, the STOP signal which accompanies it allows the enabling of gate G10, which causes the reading into memory FLRS the contents of wires D20 to D27, that is a time interval which defines a channel. In other words, file FLRS registers the identities of the channels as they become idle. The writing of the identity of an outgoing line into file FLLS is controlled by gate G4 which is enabled, on one hand, by its first input which receives the VAL signal and, on the other hand, by its second input which is enabled during each time interval ITs, that is each time interval of the signalling channel CO during which the output module transmits data to the control module GR.

We note, that in the realization example just described, each time-division bus BHDS or BHDS has eight wires D20 to D27 through which the control module GR delivers the sequence of the time interval numbers. The links between the time bases BT1 or BT2 and the buses have not been shown to avoid overloading the drawings, but are obvious for someone practicing in the field. Another solution would have consisted in counting cyclically in each input or output module the clock signals H start from an initial state. However, this second method requires the initializing of all the modules. However, with the solution described only the control module needs to be initialized which is an advantage for a dynamic implementation.

In other respects, in the example described, each even time interval of channel C0 is individually assigned to an input or output module, but the odd time intervals ITge are assigned to the transmission of service messages coming from the control module, the input or output module, to which the signalling message is addressed, recognizing itself by its identity which is in the same time interval transmitted on the data channel. Of course, the odd time intervals of channel C0 could be individually assigned to the input or output modules. However, the first solution allows an increase in the route switching speed, because the control module, as soon as it has found the necessary input or output resources, use the subsequent time interval ITge, instead of waiting for the one addressed to the corresponding module, Finally, since the output modules serve a number of outgoing lines, it is anyhow necessary to transmit the identity of this line.

The embodiments of the invention in which an exclusive property or privilege is claimed are defined as follows:

1. A data packet switching system comprising a plurality of input modules (Pei) receiving ingoing packets, a plurality of output modules (PSi) transmitting outgoing packets, a double access central memory (M) divided into routing modules (PTi, PAj) and a resource management module (GR), characterized in that it has an input time-division bus (BHDE) to connect on a time-division mode selected input modules (PEi) to selected routing modules (PTi, PAj) in the central memory (M) respectively, and an output time-division bus (BHDS) to connect in time-division mode selected routing modules (PTi, PAj) in the central memory (M) to selected output modules respectively, the resource management module (GR) being bidirectionally connected to the input modules (PEi) and to the control memory (M) by the input time-division bus (BHDE), on one hand, and to the output modules (PSi) and to the central memory (M) by the output time-division of bus (BHDS), on the other hand.

2. A packet switching system in accordance with claim 1, characterized in that each time-division bus, either of input (BHDE) or of output (BHDS), has a plurality of sets of data wires (D0 to D7, D8, D10 to D12, D30 to D37) each transmitting multiple bytes of data in parallel, and a set of time-division identity wires (D20 to D28) transmitting the identities of the time intervals that make up recurrent time frames, each frame in the sequence of frames, containing $2^k$ time intervals, the time intervals being separated by $2^{k1}$ intervals, with $K^1$ smaller than k, forming a transmission time-division channel, the transmission time-division channels numbering $2^{k-k1}$, one of the said time-division channels being reserved for signalling between the modules, either of input (PEi), or of output (PSi) and the resource management module (GR).

3. A packet switching system in accordance with claim 2, characterized in that, in the time-division channel reserved for signalling messages, the time intervals are each allocated to a module.

4. A packet switching system in accordance with claim 3, characterized in that the time-division channel reserved for signalling includes first even and odd time rank intervals (ITs(i)) that are selectively allocated to the input modules (PEi) or output modules (PSi), depending whether it is the input time-division bus (BHDE) or output time division bus (BHSD), and second even and odd time rank intervals (ITGe) to the resource management module.

5. A packet switching system in accordance with one of claims 2, 3 or 4, characterized in that, for each packet transmission to the central memory (M) on the input time-division bus (BHDE) or coming from the central memory (M) on the output time-division bus, is assigned a time-division channel selected among the time-division channels excluding the one reserved for signalling messages.

6. A packet switching system in accordance with one of claims 2, 3 or 4, characterized in that a plurality of sets of data wires has a first set (D0 to D7) serving to transmit data packets or input module (PEi) identities or output module (PSi) identities, a second set of wires (D30 to D37) used to transmit the identities of the routing modules (PTI, PAj), a third set of wires (D8) used to transmit end of packet (STOP) signals, and a fourth set of wire (D10 to D12) used to transmit channel assignments.

7. A packet switching system in accordance with claim 5, characterized in that, a plurality of sets of data wires has a first set (D0 to D7) serving to transmit data packets or input module (PEi) identities or output module (PSi) identities, a second set or wires (D30 to D37) used to transmit the identities of the routing modules (PTi, PAj), a third set or wires (D8) used to transmit end of packet (STOP) signals, and a fourth set of wires (D10 to D12) used to transmit channel assignments.

8. A packet switching system in accordance with claim 7, characterized in that, in the input time-division bus (BHDE), the first set of wires (D0 to D7) is used, to begin, in one of the even and odd rank interval (ITs(i)) assigned to an input module (PEi), to transmit to the input module (PEi) towards the resource management module (GR) the routing data of a packet to be switched, then, in response, during one of the even and odd rank intervals (ITge) of the time-division channel reserved to signalling messages (CO), the identity of the same input module (PEi) which receives in the same time interval, by the fourth set of wires (D10 to D12), the identity of the assigned channel (k), the memory (M) also receiving during the same time interval, the identity of the assigned channel (k) through the fourth set of wires (D10 to D12) plus the identity of the routing module (PTi, PAj) selected to store the packet by the second set wires (D30 to D37), the exchange of useful data from the packet stored on the first set of wires (D0 to D7) in the successive time intervals of the assigned channel (k) between the input module (PEi) and the routing module (PTi, PAj) selected for it, up to the last bytes of the packet which is accompanied of the end of packet signal transmitted on the third set or wires (D8) and received simultaneously in the memory (M) and the resource management module (GR).

9. A packet switching system in accordance with claim 6, characterized in that, in the output time-division bus (BHDS), the first set of wires (D0 to D7) is used, firstly, in one of the even and odd rank interval (ITge) of the time-division channel (C0) reserved for signalling message, to transmit the identity of the output module (PSi) intended to transmit the packet, the said output module receiving in the same time interval (ITge) the identity of the assigned channel (k), the memory (M) also receiving, always in the same time interval (ITge), the identity of the assigned channel (k) through the fourth set of wires (D10 to D12) plus the identity of the routing module (PTI, PAj) in which is stored the said packet through the second set of wires (D30 to D37), the exchange of useful data being carried out on the first set of wires (D0 to D7) in successive time intervals of the allocated channel (k) between the routing module (PTi, PAj), up to the last bytes of the packet which is accompanied by the end of packet (STOP) signal transmitted on the third set of wires (D8) and received simultaneously in the output module (PSi) and the resource management module (GR).

10. A packet switching system in accordance with claim 7, characterized in that, in the output time-division bus (BHDS), the first set of wires (D0 to D7) is used, firstly, in one of the even and odd rank interval (ITge) of the time-division channel (C0) reserved for signalling messages, to transmit the identity of the output module (PSi) intended to transmit the packet, the said output module receiving in the same time interval (ITge) the identity of the assigned channel (k), the memory (M) also receiving, always in the same time interval (ITge), the identity of the assigned channel (k) through the fourth set of wires (D10 to D12) plus the identity of the routing module (PTi, PAj) in which is stored the said packet through the second set of wires (D30 to D37), the exchange of useful data being carried out on the first set of wires (D0 to D7) in successive time intervals of the allocated channel (k) between the routing module (PTi, PAj), up to the last bytes of the packet which is accompanied by the end of packet (STOP) signal transmitted on the third set of wires (D8) and received simultaneously in the output module (PSi) and the resource management module (GR).

11. A packet switching system in accordance with claim 8, characterized in that, in the output time-division bus (BHDS), the first set of wires (D0 to D7) is used, firstly, in one of the even and odd rank interval (ITge) of the time-division channel (C0) reserved for signally messages, to transmit the identity of the output module (PSi) intended to transmit the packet, the said output module receiving in the same time interval (ITge) the identity of the assigned channel (k), the memory (M) also receiving, always in the same time interval (ITge), the identity of the assigned channel (k) through the fourth set of wires (D10 to D12) plus the identity of the routing module (PTi, PAj) in which is stored the said packet through the second set of wires (D30 to D37), the exchange of useful data being carried out on the first set of wires (D0 to D7) in successive time intervals of the allocated channel (k) between the routing module (PTi, PAj), up to the last bytes of the packet which is accompanied by the end of packet (STOP) signal transmitted on the third set of wires (D8) and received simultaneously in the output module (PSi) and the resource management module (GR).

* * * * *

UNITED STATES PATENT AND TRADEMARK OFFICE
CERTIFICATE OF CORRECTION

PATENT NO. : 4,870,640

DATED : September 26, 1989

INVENTOR(S) : Jean Yvon Coatrieux, Daniel Cheminel and Bernard Thepaut

It is certified that error appears in the above-identified patent and that said Letters Patent is hereby corrected as shown below:

Column 1, line 65, "$2^1$" should read -- $2^{k1}$ --;
Column 4, line 49, "ITS(i)" should read -- ITs(i) --;
Column 4, line 59, "could" should read -- would --.
Column 5, line 26, "Further" should read -- Furthermore --;
Column 7, line 65, "BFOR" should read -- GFOR --;

Column 8, line 21, "ITS" should read -- ITs --;
Column 8, line 29, "ITs(1)" should read -- ITs(i) --;
Column 8, line 66, "and" should read -- an --.
Column 9, line 32, "and ninth" should read -- and a ninth --;

Column 10, line 33, "PSI" should read -- PSi --;
Column 10, line 59, "and" should read -- are --;
Column 11, line 9, "Ed" should read -- ED --;
Column 13, line 17, "form" should read -- from --;
Column 13, line 59, "so" should read -- SO --;
Column 14, line 17, "if" should read -- of --;
Column 14, line 63, "ITGE" should read -- ITge --;
Column 18, line 2, "(ITGe)" should read -- (ITge) --;
Column 18, line 28, "or" should read -- of --.

Signed and Sealed this

Thirteenth Day of November, 1990

Attest:

HARRY F. MANBECK, JR.

*Attesting Officer*     Commissioner of Patents and Trademarks